(12) United States Patent
Kholopov et al.

(10) Patent No.: US 10,437,134 B2
(45) Date of Patent: Oct. 8, 2019

(54) CAMERA HOUSING/OBJECTIVE SYSTEM (71) Applicant: BASLER AG, Ahrensburg (DE)

(72) Inventors: Andrej Kholopov, Ahrensburg (DE); Stefan Petersen, Ahrensburg (DE); Benjamin Hagemann, Ahrensburg (DE)

(73) Assignee: BASLER AG, Ahrensburg (DE)

( * ) Notice: Subject to any disclaimer, the term of this patent is extended or adjusted under 35 U.S.C. 154(b) by 0 days.

(21) Appl. No.: 15/753,985

(22) PCT Filed: Aug. 26, 2016

(86) PCT No.: PCT/EP2016/070156
§ 371 (c)(1),
(2) Date: Feb. 21, 2018

(87) PCT Pub. No.: WO2017/032866
PCT Pub. Date: Mar. 2, 2017

(65) Prior Publication Data
US 2018/0246395 A1 Aug. 30, 2018

(30) Foreign Application Priority Data
Aug. 26, 2015 (DE) .......................... 10 2015 114 203

(51) Int. Cl.
*G03B 17/00* (2006.01)
*G03B 17/12* (2006.01)
(Continued)

(52) U.S. Cl.
CPC ............... *G03B 17/12* (2013.01); *G03B 3/02* (2013.01); *G03B 43/00* (2013.01)

(58) Field of Classification Search
USPC ........................................................ 396/533
See application file for complete search history.

(56) References Cited

U.S. PATENT DOCUMENTS 2,129,562 A * 9/1938 Brueck ..................... G03B 9/08
396/510
2,587,560 A * 2/1952 Widmer .................. F16B 39/12
411/231
(Continued)

FOREIGN PATENT DOCUMENTS

DE 4419910 12/1994
DE 69232973 T2 * 12/2003 ....... G08B 13/19619
(Continued)

OTHER PUBLICATIONS

Werner Kraus, "Turning Out Construction," 2d ed., 1987 (pp. 539-552); Dr. Alfred Huthing Publishing House Heidelberg.
(Continued)

*Primary Examiner* — Rodney E Fuller
(74) *Attorney, Agent, or Firm* — Price Heneveld LLP (57) ABSTRACT

A camera housing/lens system comprises a camera housing for a camera and a lens. The camera housing/lens system further comprises a lock for locking the lens in position. The lock includes a stop member joined to the lens or the lens mount, and an elastic element arranged between the stop member and the lens mount or between the stop member and the lens, wherein the elastic element is compressed between the stop member and the lens mount or between the stop member and the lens to lock the lens in position. A gap remains between the stop member and the lens mount or between the stop member and the lens. This "elastic compression" allows the position of the lens to be finely adjusted in relation to the lens mount, without having to release the compression in order to do so.

17 Claims, 6 Drawing Sheets

(51) Int. Cl.
*G03B 3/02* (2006.01)
*G03B 43/00* (2006.01)

(56) References Cited

U.S. PATENT DOCUMENTS

| | | | | |
|---|---|---|---|---|
| 2,691,322 | A * | 10/1954 | Wittel | G03B 3/02 |
| | | | | 359/825 |
| 5,394,209 | A * | 2/1995 | Stiepel | G08B 13/19619 |
| | | | | 348/151 |
| 5,855,463 | A * | 1/1999 | Newby | F16B 39/18 |
| | | | | 411/244 |
| 5,920,061 | A * | 7/1999 | Feng | G06K 7/10722 |
| | | | | 235/462.42 |
| 2004/0109078 | A1* | 6/2004 | Artonne | G03B 27/735 |
| | | | | 348/335 |
| 2009/0046382 | A1* | 2/2009 | Kuroda | G02B 7/08 |
| | | | | 359/823 |
| 2011/0096424 | A1* | 4/2011 | Lee | G02B 7/021 |
| | | | | 359/829 |
| 2015/0326766 | A1* | 11/2015 | Czepowicz | H04N 5/2253 |
| | | | | 348/360 |
| 2016/0124290 | A1* | 5/2016 | Bergreen | G03B 17/565 |
| | | | | 396/533 |
| 2016/0306262 | A1* | 10/2016 | Weidner | G03B 17/12 |
| 2017/0139226 | A1* | 5/2017 | Adervall | G02B 7/04 |

FOREIGN PATENT DOCUMENTS

| | | |
|---|---|---|
| DE | 102014109912 | 7/2014 |
| GB | 2362223 | 11/2001 |

OTHER PUBLICATIONS

Werner Krause, Design Features of the Precision Mechanics, 2d ed., 2004 (pp. 207-285); Hanser Publishing House Munich.

\* cited by examiner

CAMERA HOUSING/OBJECTIVE SYSTEM

CROSS-REFERENCE TO FOREIGN PRIORITY APPLICATION

The present application claims the benefit under 35 U.S.C. §§ 119(b), 119(e), 120, 121, 365(c) and/or 386(c) of PCT/EP2016/070156 filed Aug. 26, 2016, which claims priority to German Application No. 102015114203.1 dated Aug. 26, 2015.

FIELD OF THE INVENTION

The present invention relates to a camera housing/lens system comprising a camera housing for a camera and a lens having a longitudinal lens axis, wherein the camera housing is provided with a lens mount for attaching the lens. The lens mount includes a connecting thread and the lens includes a lens thread. The connecting thread and the lens thread engage when the lens is attached, wherein a position of the lens along the longitudinal lens axis in relation to the lens mount can be set by turning the lens relative to the lens mount. In order to lock the lens in position, the camera housing/lens system has a lock.

BACKGROUND OF THE INVENTION

In camera housing/lens systems of this kind, the lock is realised, for example, by a counter nut (also referred to sometimes as a "locknut"), which is screwed onto the lens thread and which is turned to lock the lens in position in such a way that it abuts a contact surface of the lens mount, such that force-locking engagement is produced between the connecting thread, the counter nut and the lens thread. When the lock is realised in this way, the strength of the force-locking engagement and hence the locking effect depend substantially on the strength of compression between the lens mount and the counter nut, i.e. on the strength with which the counter nut is turned against the contact surface of the lens mount.

When the lens is locked into position by means of a counter nut in the manner described, it proves difficult in practice to set and lock the position of the lens with exactitude, because even when the position of the lens can initially be set with precision by turning the lens relative to the lens mount, this setting is generally altered when subsequently locking it into place by means of the counter nut, due to the forces applied during such locking. However, in many cases, the exact setting of the lens position is important for the imaging characteristics and the image quality of a camera, for example, of an industrial camera that includes the camera housing/lens system, it is often necessary to correct the setting and locking into position in a process of trial and error. To that end, the compression between the lens mount and the counter nut must be released again in each case, after which the position of the lens along the longitudinal lens axis in relation to the lens mount can be readjusted and the counter nut can be tightened again. This iterative process of finely adjusting the position of the lens is both time-consuming and difficult.

SUMMARY OF THE INVENTION

It is, therefore, an object of the present invention to provide a way of simplifying the process of setting and locking the position of the lens along the longitudinal lens axis in relation to the lens mount.

This object is achieved according to one aspect of the present invention by the camera housing/lens system initially described, wherein the lock includes a stop member joined to the lens or the lens mount, and an elastic element arranged between the stop member and the lens mount or between the stop member and the lens, wherein the elastic element is compressed between the stop member and the lens mount or between the stop member and the lens to lock the lens in position, wherein a gap remains between the stop member and the lens mount or between the stop member and the lens.

Thus, in the camera housing/lens system according to the invention, a stop member is provided which is connected to the lens or the lens mount, depending on the configuration of the camera housing/lens system. In addition to the stop member, an elastic element is also provided which is arranged in the former variant between the stop member and the lens mount and in the latter variant between the stop member and the lens and which is compressed between the stop member and the lens mount (variant 1) or between the stop member and the lens (variant 2) to lock the lens in position, with a gap remaining between the stop member and the lens mount (variant 1) or between the stop member and the lens (variant 2).

According to the invention, the elastic element should be understood as being elastically deformable under the forces produced during normal mounting. This can be achieved, for example, by an elastic element consisting of an easily deformable material, for example, an elastomeric plastic, in the form of a sealing ring or an O-ring, for example. The elastic element can also take the form of a resilient element and have a geometry capable of resilient deformation. In this case, the elastic element may also be made from stiffer materials, such as metal, because the elasticity is produced by the geometry. The elastic element can thus be designed as a shaft ring, a spring disc, a serrated disc with an undulating circumferential contour, or the like. Elastic compression is produced by changing the shape or geometry of the elastic element during mounting.

Compared to conventional compression, this elastic compression has the advantage that, by exploiting the friction forces produced between the stop member, the elastic element, and the lens mount or the lens by compressing the elastic element, it allows the position of the lens in relation to the lens mount to be finely adjusted without having to release the compression every time in order to do so. After the elastic element has been compressed between the stop member and the lens mount or between the stop member and the lens, it is possible, instead, to set the position of the lens relative to the lens mount with exactitude by turning the lens relative to the lens mount, without the compression being released (or having to be released) in the process. "Elastic compression" is also advantageously capable of locking a lens position sufficiently securely once it has been (finely) adjusted, so that it does not alter when the camera is used in the intended manner. In addition, this compression can be intensified by tightening the stop member even more, so as to lock the lens in position even more securely.

In one embodiment of the invention, the stop member may be joined axially fixedly to the lens or the lens mount, i.e., it is not possible for it to be moved along the longitudinal lens axis relative to the lens, for example in variant 1 above. In this case, the fine adjustment range of the lens position is determined by the extent to which the elastic element can be compressed. An elastic element which can be greatly compressed therefore allows a greater range of fine adjustment than an elastic element which is less compressible.

The axially fixed connection cannot be a non-releasable connection, for example, if the stop member is integrally embodied in the lens or the lens mount. In such a variant, rough adjustment of the lens position is predefined by the positioning of the stop member on the lens or the lens mount.

Alternatively, however, the fixed connection may also be releasable. For example, the stop member may have at least one screw in an outer circumferential surface, by means of which at least the stop member can be joined by force-locking engagement to the lens or the lens mount, and if the force-locking engagement is released by loosening the screw(s), the stop member, for example in the preceding variant 1, can be moved axially along the longitudinal lens axis relative to the lens. In such an embodiment, the rough positioning of the lens position can be adjusted by positioning the stop member at a desired position on the lens or the lens mount.

According to the invention, when the lens is locked into position, a gap remains between the stop member and the lens mount (variant 1) or between the stop member and the lens (variant 2). This means that the stop member and the lens mount or the stop member and the lens are not into contact with each other when the lens is locked into position.

In this case, the elastic element is clamped between two surfaces. These surfaces may be arranged perpendicular to the clamping direction, for example as annular areas on the end face. It is preferred, however, if the orientation of one or both of the areas abutted by the elastic element can diverge from the perpendicular, i.e., is inclined. For example, one or both of the end faces can be conical in shape, and more specifically with a steep cone angle. In this way, it is advantageously possible to prevent the elastic element from being pressed out of its clamped position between the respective surfaces, for example, radially outwards, if the surface(s) slope(s) conically inwards. The elastic element can also be pressed advantageously onto a circumferential surface of the thread in this way, thus resulting in rotational fixing by friction force, which is desirable.

In one preferred embodiment, the stop member is formed by a counter member having a counter-member thread, which engages in the lens thread or in the connecting thread. In such an embodiment, the stop member is not joined axially fixedly to the lens or the lens mount, but can be moved axially relative to the lens or the lens mount by turning it. This is particularly advantageous, firstly because it means that the rough positioning of the lens can be adjusted by the stop member being positioned by turning it relatively to a desired position on the lens or the lens mount. Secondly, by exploiting the friction forces produced between the stop member, the elastic element, and the lens mount or the lens by compressing the elastic element, it is also possible to finely adjust the lens position more extensively when the lens has already been placed on or pressed against the elastic element, because in this condition the stop member remains stationary relative to the lens mount when the lens is turned. The "elastic compression" is not released, therefore, even when the lens position is being finely adjusted relative to the lens mount by turning the lens. Such fine adjustment can be carried out within a particular range due to the compressibility of the elastic element.

In one preferred embodiment, the elastic element is made of a polymer material, in particular a rubbery elastic material, or a spring steel. It is particularly preferred that the elastic element is an axially resilient metal element, such as a metal shaft ring or an elastic rubber ring, which may be made, for example, of a rubber material, in particular of nitrile butadiene rubber (NBR) or of ethylene propylene diene monomer (EPDM) rubber. The latter is preferably disposed around the lens thread or around the connecting thread. Such a design has the advantage, in particular, that the friction forces produced between the stop member, the elastic element, and the lens mount or the lens by compressing the elastic element are distributed very evenly and reliable elastic deformation can be achieved without plastic deformation components reducing the desired elastic pressing force. The adjustability of the axial lens position is made possible by positioning the elastic element and the counter member over a wide range and is defined by the length of the thread. The axial position of the lens can basically be determined as a result. If the lens and the counter member are then in contact with the elastic element and have partially compressed the latter, a range of fine axial adjustment is provided by the elastic element, within which the lens position relative to the lens mount is reliably set. Within this range of fine adjustment, and depending on the configuration of the lens mount, the lens, and the stop member, the axial distance between the lens and the image sensor plane can be finely adjusted, and the elastic biasing force of the elastic element can be kept the same or can be slightly increased or decreased. This thus allows fine adjustment of the axial distance of the lens to the camera housing and the image sensor mounted therein.

An undeformed cross-sectional area of the elastic element is preferably elliptical, oval, or circular in shape. It is possible in this way to give the elastic element particularly beneficial deformation properties and to produce a strong friction force due to deformation of the elastic element, with the result that any alteration of the locked lens position can be reliably prevented.

It is also preferred that an outer diameter of the elastic element is less than or equal to an outer diameter of the stop member and/or the elastic element has a cross-sectional geometry and an inner diameter such that the inner diameter of the compressed elastic element is less than an outer diameter of the lens thread. This is advantageous, because when designed in this way, the elastic element and the elastic rubber ring, in particular, can be safely compressed by the stop member, without being squeezed out laterally, for example, which would have a detrimental effect on the compression.

It is preferable that the stop member and the lens mount or the stop member and the lens each include a stop surface, the stop surfaces being substantially perpendicular to the longitudinal lens axis, and the elastic element being compressed between the stop surfaces to lock the lens in position. Such a variant is well able to ensure safe compression of the elastic element, in particular, of the elastic rubber ring.

In one preferred variant, the connecting thread is an internal thread provided on an inner surface of the lens mount, and the lens thread is an external thread provided on an outer surface of the lens. In this variant, the lens thread is screwed into the connecting thread when the lens is attached to the camera housing. As an alternative, it is also possible for the connecting thread to be an external thread provided on an outer surface of the lens mount, and for the lens thread to be an internal thread provided on an inner surface of the lens. In this variant, the lens thread is screwed onto the connecting thread when the lens is attached to the camera housing.

It is preferred that the stop member is a counter nut having a counter-member thread as its internal thread, the stop member being screwed onto the lens thread or onto the connecting thread.

It is also preferred that the lens mount is designed in the form of a tube extending from the camera housing. Such a design makes it possible to ensure that the lens is securely attached, because the connection surface can be made sufficiently large due to the tubular design of the lens mount. It is also advantageous in this regard if the connecting thread is provided over the full length of the tube (or at least over a substantial part of it). It is further preferred that the lens mount is integral with the camera housing. This allows the camera housing to be produced as an integral part in a simple and cost-efficient manner, for example, in a moulding process, an injection moulding process, or the like.

In the camera housing/lens system according to the invention, no fixed lens stop specifying the position of the lens is typically provided between the lens and the lens mount. A fixed lens stop is to be understood here as a stop which sets the position of the lens in direct contact with the lens mount such that any elastic deformation occurring in this direct contact is so small that it is below the tolerance limits for setting the flange focal depth. In such connections, no elastic element whose range of elastic deformation is greater than the tolerance limits for setting the flange focal depth is involved in the transmission of force between the lens and the lens mount. According to the invention, in contrast, an elastic element is included in the chain of forces between the lens and the lens mount, said elastic element having a range of elastic deformation which deliberately allows the flange focal depth to be altered beyond its tolerance range.

The camera housing/lens system can preferably be fitted with lenses having different focal lengths, i.e., with different focal points, the appropriate position for each lens relative to the lens mount being set by turning the lens relative to the lens mount.

It is further preferred that when the lens is in contact with the elastic element and, if relevant, when the elastic element has a partially compressed shape, the stop member is formed by a counter member with a counter-member thread which engages in the lens thread, wherein, when the lens is in this position, and when the lens is turned relative to the lens mount a first static friction force ($F_{R1}$) acting between the counter member and the elastic element about the longitudinal lens axis is greater than a static friction or sliding friction force which is generated between the lens thread and the counter-member thread by turning the lens relative to the lens mount, plus any friction force generated between the lens thread and the elastic element due to radial expansion of the elastic element, and a second static friction force ($F_{R2}$) acting between the elastic element and the lens mount about the longitudinal lens axis is greater than the static friction or sliding friction force which is generated between the lens thread and the counter-member thread by turning the lens relative to the lens mount, plus any friction force generated between the lens thread and the elastic element due to radial expansion of the elastic element.

It should be understood as a basic principle that, in this embodiment, the counter-member thread can also engage with the connecting thread instead of the lens thread. This embodiment ensures that, after producing the desired tension, that is, after the lens has come into contact with the elastic element and pre-tensioned until the elastic element has a partially compressed shape, the lens can be focussed and its flange focal depth finely adjusted by screwing the lens further into the connecting thread or screwing it out from the connecting thread. The position of the counter member can remain unchanged thereby, so the amount of elastic compression can change due to the change in lens position. Alternatively, if different friction forces or thread pitches are involved, the position of the counter member and the lens relative to each other may also remain unchanged, which would mean that they are moved jointly relative to the lens mount, with the consequence that the original tension is kept. If the elastic element is clamped directly between the lens and the lens mount, then the lens can likewise be finely adjusted by turning it relative to the lens mount, with a concomitant change in the tension applied to the elastic element. In other embodiments in which the elastic element is clamped between a counter member and the lens mount, fine adjustments can be made by turning the counter member and the lens jointly relative to the lens mount, likewise with a concomitant change in the tension applied to the elastic element. In principle, any embodiments involving a separate counter member also allow fine adjustment without changing the tension of the elastic element, in that the gap between the stop surfaces compressing the elastic element is kept constant by means of the counter member, despite the lens being turned relative to the lens mount.

When the lens is attached and they engage with each other, the connecting thread and the lens thread can preferably have a slight amount of play, without this ruling out the ability to set and lock the lens position relative to the lens mount, in accordance with the invention.

According to another aspect of the present invention, a camera comprising a camera housing/lens system according to the claims is provided. The camera is preferably an industrial camera, of the kind that may be used in the field of quality control, for example, or in a wide range of monitoring applications.

According to yet another aspect of the present invention, a method for setting and locking the position of a lens in a camera housing/lens system is described, comprising a camera housing for a camera and the lens having a longitudinal lens axis, wherein the camera housing is provided with a lens mount for attaching the lens, wherein the lens mount includes a connecting thread and the lens includes a lens thread, wherein said connecting thread and said lens thread engage when the lens is attached, wherein a position of the lens along the longitudinal lens axis in relation to the lens mount can be set by turning the lens relative to the lens mount, wherein the method comprises the steps of providing a lock for locking the lens in position, wherein the lock includes a stop member formed on the lens mount, or a counter member having a counter-member thread, which engages in the lens thread or in the connecting thread, and an elastic element arranged between the counter member and the lens mount or between the stop member or counter member and the lens, and turning the lens relative to the stop or counter member to compress the elastic element between the stop or counter member and the lens mount or between the stop or counter member and the lens in order to lock the lens in position, wherein a gap remains between the stop or counter member and the lens or between the stop or counter member and the lens.

It is preferred that the stop member is formed by a counter member having a counter-member thread, which engages in the lens thread or in the connecting thread, wherein the method further comprises the step of turning the lens relative to the lens mount, with the elastic element under tension, in order to finely adjust the position of the lens in relation to the lens mount.

It is particularly preferred that the friction forces between the elastic element, the counter member, the lens thread and the counter-member thread are such, when the lens is locked into position, that on turning the lens relative to the lens mount the lens thread turns relative to the connecting thread and to the counter-member thread. This can be achieved with appropriate static friction and sliding friction forces, which as previously described are determined and adjusted by the pairs of materials, the surface characteristics and the thread pitches. This specific setting allows the focus or flange focal depth to be finely adjusted, without removing the tension between the lens and the elastic element.

It should be understood that a preferred embodiment of the invention may also comprise any combination of the dependent claims with the respective independent claim.

BRIEF DESCRIPTION OF THE DRAWINGS

These and other aspects of the invention shall now be described with reference to the Figures described below, in which.

DETAILED DESCRIPTION OF THE EMBODIMENTS

In the Figures, the same or corresponding elements or units are each provided with the same and/or the corresponding reference signs. When an element or a unit has already been described with reference to a particular Figure, a detailed description is dispensed with when discussing another Figure. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
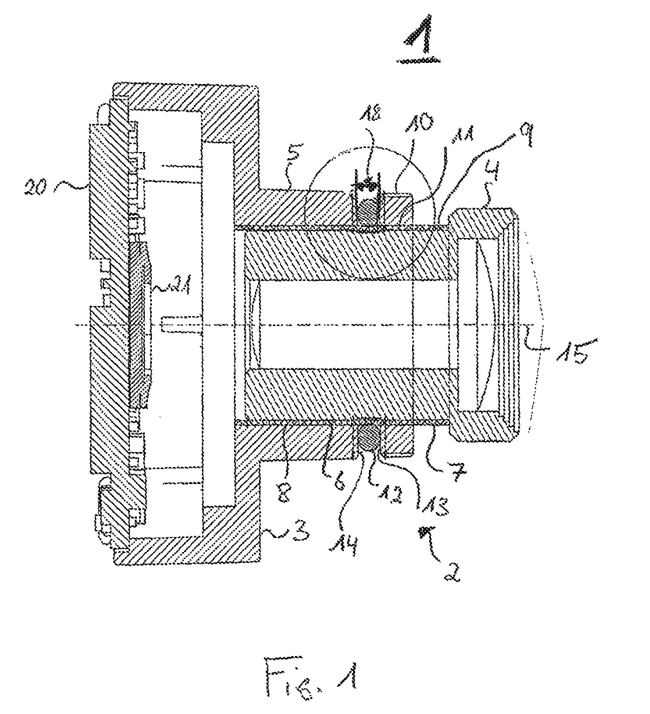
FIG. 1 is a cross-sectional view showing, in schematic form and by way of example, an embodiment of a camera according to the present invention.

FIG. 1 is a cross-sectional view showing, in schematic form and by way of example, an embodiment of a camera 1 according to the present invention. In this example, camera 1 is an industrial camera, of the kind that may be used in the field of quality control, for example, or in a wide range of monitoring applications. Camera 1 comprises a camera housing/lens system 2, which, for its part, comprises a camera housing 3 and a lens 4 having a longitudinal lens axis 15. A carrier board 20, on which an image sensor 21 for detecting an image is provided, is arranged on camera housing 3. Camera housing 3 is provided with a lens mount 5 for attaching lens 4.

Lens mount 5 has a connecting thread 6, and lens 4 has a lens thread 7, wherein connecting thread 6 and lens thread 7 engage with each other when lens 4 is attached. In this embodiment, connecting thread 6 is an internal thread provided on an inner surface 8 of lens mount 5, and lens thread 7 is an external thread provided on an outer surface 9 of lens 4, so lens thread 7 is screwed here into connecting thread 6 when attaching lens 4 to camera housing 3, and a position of lens 4 along longitudinal lens axis 15 in relation to lens mount 5 can be set by turning lens 4 relative to lens mount 5.

In the camera housing/lens system 2 shown in FIG. 1, lens mount 5 is in the form of a tube. The latter extends from camera housing 3 and, in this embodiment, is integral with camera housing 3.

Camera housing/lens system 2 further comprises a lock 10, 12 for locking lens 4 in position. Lock 10, 12 comprises a stop member 10 which is screwed or placed (e.g., the variant with a sleeve and threaded pin) or joined to lens 3 and an elastic element 12 arranged between stop member 10 and lens mount 5, said elastic element 12 being compressed between stop member 10 and lens mount 5 to lock lens 4 in position, with a gap 18 remaining between stop member 10 and lens mount 5.

In this embodiment, stop member 10 is a counter nut having a counter-member thread as its internal thread 11, wherein stop member 10 is screwed onto lens thread 7.

In this embodiment, elastic element 12 is an elastic rubber ring arranged around lens thread 7. An undeformed cross-sectional area of elastic element 12 is circular in shape, and an outer diameter of elastic element 12 is preferably smaller than an outer diameter of stop member 10. It is particularly preferred that the inner circumference of the elastic rubber ring in its undeformed state rests against the lens thread and exercises a friction force thereon.

Stop member 10 and lens mount 5 each have a stop surface 13, 14. Stop surfaces 13, 14 are substantially perpendicular to the longitudinal lens axis 15, wherein elastic element 12 is compressed between stop surfaces 13, 14 to lock lens 4 in position.

In the camera housing/lens system 2 shown in FIG. 1, no fixed lens stop for presetting the position of lens 4 is provided. In particular, camera housing/lens system 2 can be equipped with lenses 4 of different focal lengths, i.e., with different focal points, the appropriate position for the respective lens 4 relative to lens mount 5 being set by turning lens 4 relative to lens mount 5.

Figure 2:
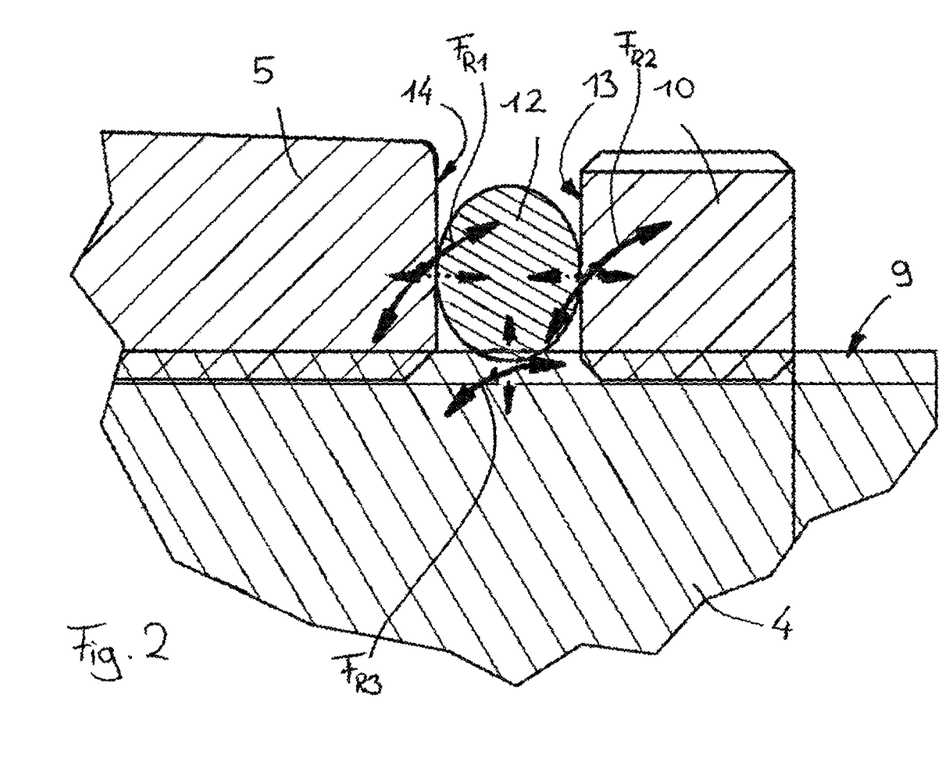
FIG. 2 is a detail of the cross-sectional view shown in FIG. 1, showing, in schematic form and by way of example, the forces which occur when locking the lens in position in the embodiment of the camera.

FIG. 2 shows a detail of the cross-sectional view shown in FIG. 1, which shows, in schematic form and by way of example, the forces which occur when lens 4, in the embodiment of camera 1, is locked into place.

In FIG. 2, the pressing force is shown by broken lines, and the resultant friction forces are shown in perspective by solid lines as vectors perpendicular to the plane of the drawing. The elastic pressing forces produced by the "elastic compression" occur between stop surface 13 of stop member 10 and elastic element 12, and between the latter and stop surface 14 of lens mount 5, and generate friction forces in each case, referred to here as $F_{R1}$ and $F_{R2}$. Due to transverse stretching in the radial direction as a result of elastic compression in the axial direction, elastic element 12 can also be pressed inward onto a circumferential surface of the lens and exert an additional friction force FR3 acting circumferentially against a radially oriented surface of lens 4, here outer surface 9 of lens 4.

These friction forces can be affected by the dimensions of elastic element 12, its material properties, and by the surface characteristics of stop surfaces 13, 14, of outer surface 9, and of the elastic element itself. This makes it possible to achieve an advantageous ratio of the friction forces for the desired fixing in position and fine adjustment of the lens. For example, the friction forces can be set in such a way that when the lens is turned, the stop member does not rotate relative to the lens mount, so as to be able to adjust the focus via thread 9. The friction forces can also be chosen such that the lens does not turn as well when the stop member is turned, so that the fine adjustment, once achieved, can be secured by increasing the pressing force. As a basic principle, the friction forces should also fix the lens 4 in place to such an extent that the lens 4 is not released as a result of the operating forces that arise, that is, the torques, axial forces, or radial forces which are exerted on the lens during normal use are less than the forces holding the lens at the lens mount, which are produced by the pressing and friction forces and the resultant static friction moments.

Figure 3:
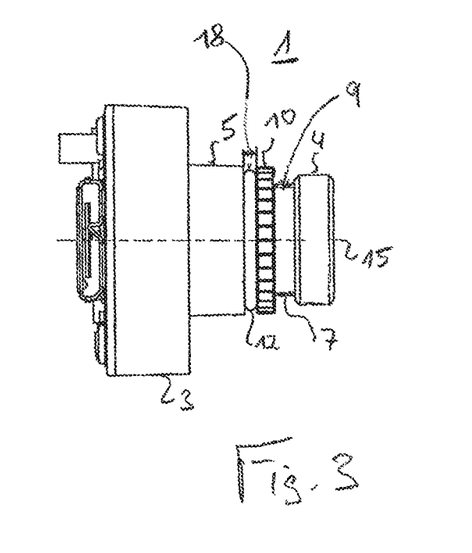
FIG. 3 shows a schematic and exemplary side view of the camera shown in FIG. 1.

FIG. 3 shows, in schematic form and by way of example, a side view of the camera 1 shown in FIG. 1. This view shows once again some of the main elements of camera 1, in particular, camera housing 3, lens 4, lens mount 5, stop member 10 (here a counter nut), and elastic element 12 (here an elastic rubber ring).

Figure 4:
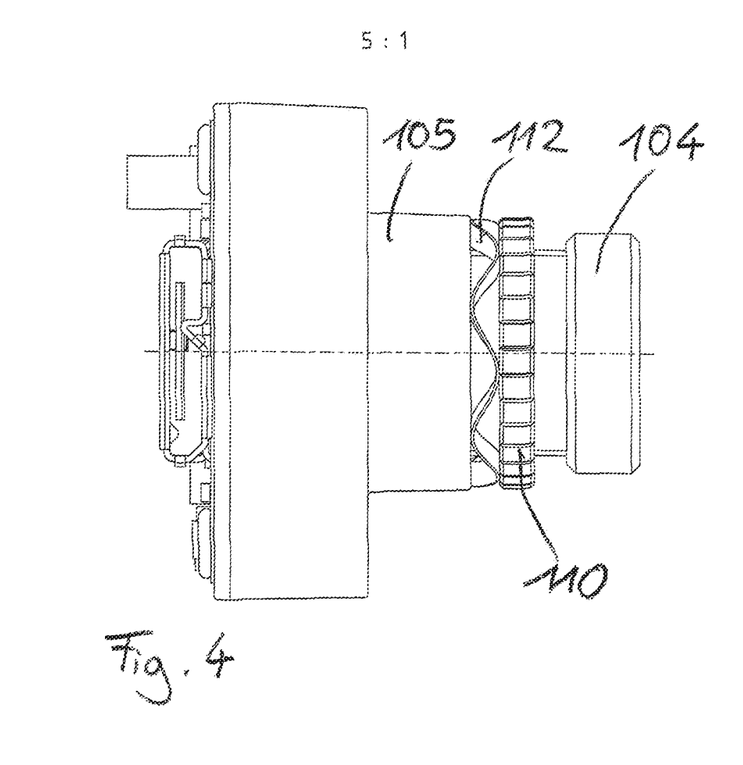
FIG. 4 shows a side view of a second embodiment of the invention.

FIG. 4 shows a variant of the first embodiment. In this variant, the elastic element is provided as a wave washer 112 between lens mount 105 and stop member 110. This wave washer 112 is of a metal material and can be made from a spring steel, in particular. Stronger pressing forces can be achieved with this variant, when the wave washer 112 is appropriately designed, than with an elastic element made of an elastomeric material. The spring disc also prevents an undesired contact at the circumferential surface of the lens because there is no transverse stretching inwards. In specific variants, the wave washer 112 can also be surface-coated on one or both sides, for example rubbered, to increase the friction forces.

Figure 5:
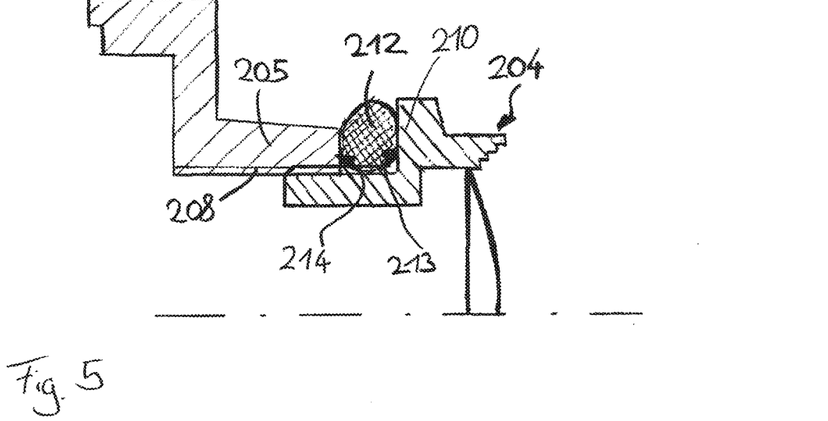
FIG. 5 shows a schematic and longitudinal cross-sectional side view of a third embodiment of the invention.

FIG. 5 shows a third embodiment of the invention. In this embodiment, stop member 210 is integrally embodied on lens 204. By turning external thread 209 on the lens into internal thread 208 on the lens mount, an elastic element 212 in the form of a rubber ring comes into contact and abuts stop surfaces 214, 213 and thus defines the basic focal position. By further turning, this focal position can be adjusted more finely, with elastic element 212 being squeezed more or less strongly in the process.

Figure 6:
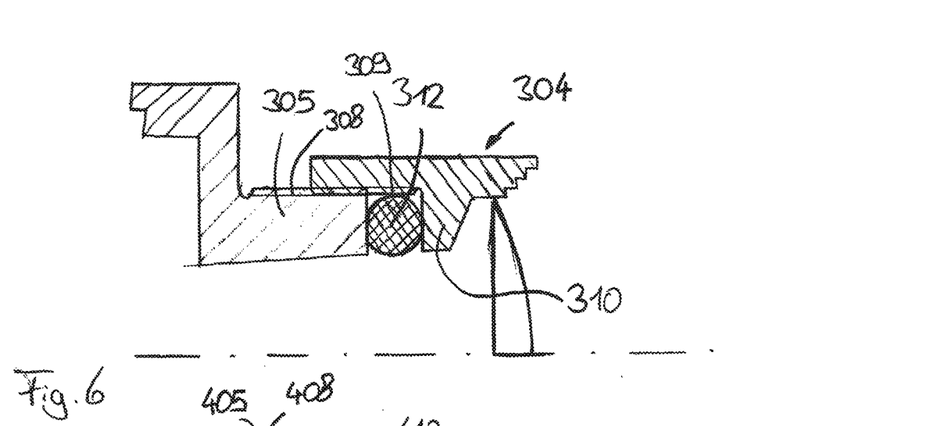
FIG. 6 shows a schematic and longitudinal cross-sectional side view of a fourth embodiment of the invention.

FIG. 6 shows a fourth embodiment of the invention. In this embodiment, the fastening screw thread on the lens mount is an external thread 308, and a matching internal thread 309 is provided on lens 304. As in the third embodiment according to FIG. 5, stop member 310 is again embodied integrally on the lens, so the focal position is basically predefined and can still be finely adjusted by screwing the lens further or less onto the lens mount, within the permitted variable squeezing of elastic element 312. The permitted squeezing of elastic element 312 should be understood in this regard to be an axial range within which the elastic element still exerts friction forces that ensure a sufficiently strong holding force to absorb the torques on the lens that arise in operation and to prevent any turning of the lens, with a resultant change in the focal position.

Figure 7:
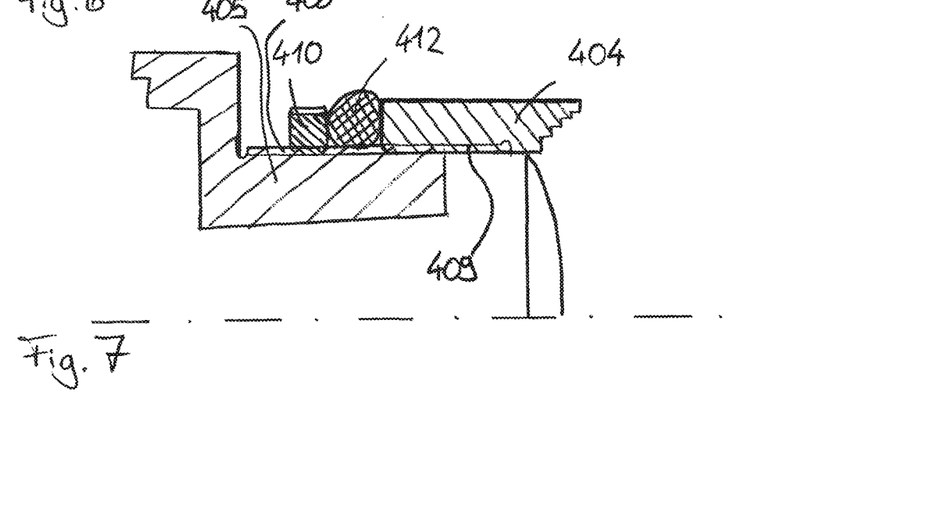
FIG. 7 shows a schematic and longitudinal cross-sectional side view of a fifth embodiment of the invention.

FIG. 7 shows a fifth embodiment of the invention, in which the fastening screw thread is likewise provided as an external thread on the lens mount, as in the fourth embodiment according to FIG. 6, and in which a matching internal thread is provided on the lens, with which the lens can be screwed onto the lens mount. In this embodiment, the fixing element is a counter nut 410 and is likewise screwed with an internal thread onto the external thread on the lens mount. Elastic element 412 is clamped as a result between counter nut 410 and a stop surface on lens 404. This embodiment allows the focus to be set within a greater range of axial adjustment, by pre-positioning stop member 410 accordingly on the fastening screw thread of the lens mount. Fine adjustment can be performed here either by screwing the lens further or less onto the fastening screw thread on the lens mount, while the counter nut is fixed, resulting in elastic element 412 being squeezed more or less strongly. Alternatively, the lens can also be turned synchronously with counter nut 410, thus maintaining the elastic biasing of elastic element 412 and allowing fine adjustment in this manner.

Figure 8:
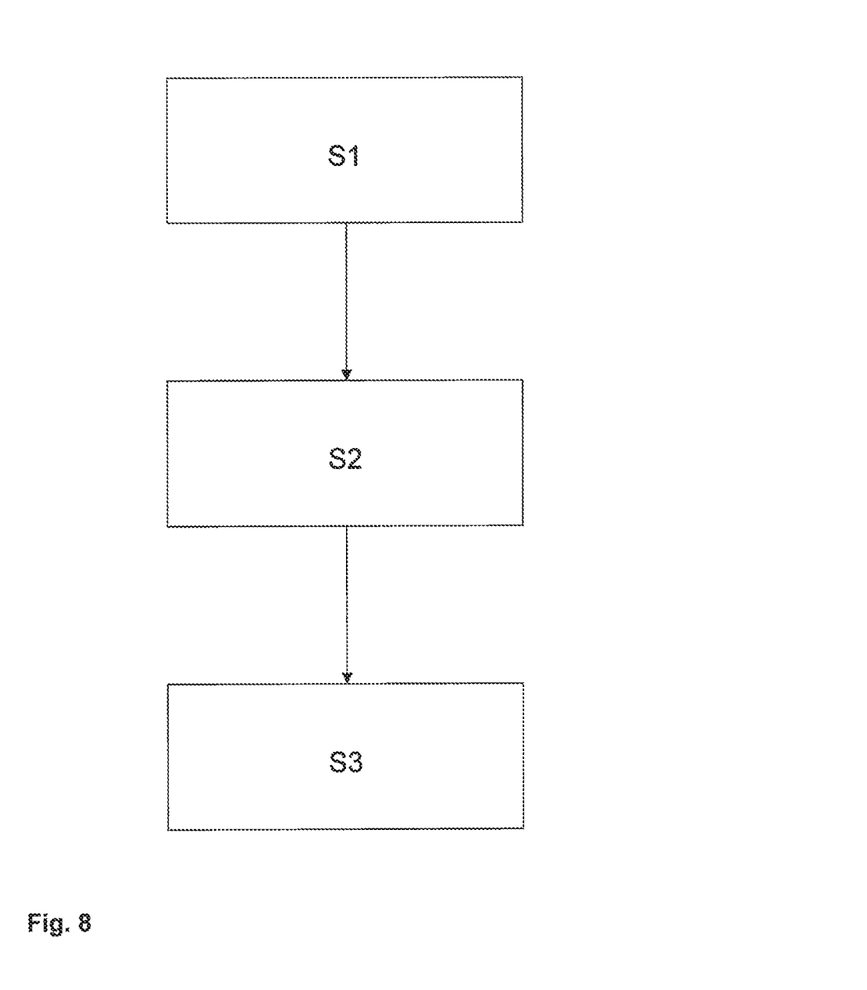
FIG. 8 shows a schematic and exemplary embodiment of a method for setting and locking the position of a lens in a camera housing/lens system.

FIG. 8 shows, in schematic form and by way of example, an embodiment of a method for setting and locking the position of a lens in a camera housing/lens system. The method is described here with reference to the camera housing/lens system 2 of the camera 1 shown in FIG. 1. As described, camera housing/lens system 2 comprises a camera housing 3 for a camera 1 and lens 4 having a longitudinal lens axis 15, wherein camera housing 3 is provided with a lens mount 5 for attaching lens 4, wherein lens mount 5 includes a connecting thread 6, and lens 4 includes a lens thread 7, wherein said connecting thread 6 and said lens thread 7 engage when lens 4 is attached, wherein a position of lens 4 in relation to lens mount 5 can be set by turning lens 4 relative to lens mount 5.

In step S1, a lock 10, 12 is provided for locking lens 4 in position, said lock including a stop member 10 joined to lens 4, and an elastic element 12 arranged between stop member 10 and the lens mount. As shown in FIG. 1, stop member 10 can be mounted rotatably on the lens by means of a thread and is therefore axially movable relative to the lens. In such a case, the focal position can initially be roughly set by screwing the lens into the lens receiver to a desired axial position.

Alternatively, stop member 10 can also be integral with the lens and therefore axially immovable in relation to the lens. In this case, focusing within a predetermined range is predefined by the position of the stop member and can only be finely adjusted by axially compressing the elastic element more or less strongly.

In step S2, stop member 10 is turned relative to lens mount 5 to compress elastic element 12 between stop member 10 and lens mount 5 so as to lock lens 4 in position, with a gap 18 remaining between stop member 10 and lens mount 5.

Fine adjustment of the focal position can then be carried out in step S3 which then follows. If the stop member is integral with the lens, fine adjustment is done either by screwing the lens further in or back out, with the elastic element being simultaneously compressed or relaxed. If the stop member can be turned as a counter member on the lens, by means of a thread, then the lens can be screwed in or out without changing the tension on the elastic element.

Whereas, in the embodiment of camera 1 shown in FIG. 1, connecting thread 6 is an internal thread provided on an inner surface 8 of lens mount 5, and lens thread 4 is an external thread provided on an outer surface 9 of lens 4, it is also possible in other embodiments (shown in FIGS. 6 and 7) that the connecting thread is an external thread 308, 408 provided on an outer surface of the lens mount, and that the lens thread is an internal thread 309, 409 provided on an inner surface of the lens. Whereas in the first variant lens thread 7 is screwed into connecting thread 6 when lens 4 is attached to camera housing 3, in the latter variant the lens thread is screwed onto the connecting thread when the lens is attached to the camera housing. The stop member can then be a counter nut, for example, having a counter-member thread in the form of an internal thread. This counter nut can then be screwed onto the connecting thread. In this case, the elastic element is arranged between the stop member and the lens and is compressed between the stop member and the lens in order to lock the lens in position, with a gap remaining between the stop member and the lens mount or between the stop member and the lens.

In other embodiments (not shown in the Figures), it is also possible that the stop member is joined axially fixedly to the lens or the lens mount. In this case, as described, the range of fine adjustability of the lens position is determined by the extent to which the elastic element is compressible. As described, the axially fixed joint can be an unreleasable joint, and, when designed in such a way, the rough setting of the lens position is predefined by the positioning of the stop member on the lens or the lens mount. Alternatively, however, the fixed joint may also be releasable. In such a variant, the rough setting of the lens position can be adjusted by positioning the stop member at a desired position on the lens or the lens mount.

In the claims, the expressions "comprise" and "comprising" do not exclude other elements or steps, and the indefinite article "a/an" does not exclude a plurality.

The fact that individual functions and/or elements are mentioned in different dependent claims does not mean that a combination of these functions and/or elements could not also be used to advantage.

The reference signs in the claims are not to be understood as meaning that the subject-matter and the extent of protection conferred by the claims is limited by these reference signs.

It will be understood that any described processes or steps within described processes may be combined with other disclosed processes or steps to form structures within the scope of the present disclosure. The exemplary structures and processes disclosed herein are for illustrative purposes and are not to be construed as limiting.

It will be understood by one having ordinary skill in the art that construction of the present disclosure and other components is not limited to any specific material. Other exemplary embodiments of the disclosure disclosed herein may be formed from a wide variety of materials, unless described otherwise herein.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A camera housing/lens system, comprising:
    a camera housing for a camera and a lens having a longitudinal lens axis, the camera housing further comprising a lens mount for attaching the lens, the lens mount including a connecting thread and the lens including a lens thread, wherein the connecting thread and the lens thread engage when the lens is attached, whereby a position of the lens along the longitudinal lens axis in relation to the lens mount can be set by turning the lens relative to the lens mount; and
    a lock for locking the lens in position, the lock further comprising a stop member formed by a counter member having a counter-member thread that engages the lens thread or the connecting thread;
    wherein the stop member is joined to the lens or the lens mount, and an elastic element is arranged between the stop member and the lens mount or between the stop member and the lens, wherein the elastic element is compressed between the stop member and the lens mount or between the stop member and the lens to lock the lens in position, and wherein a gap remains between the stop member and the lens mount or between the stop member and the lens.

2. The camera housing/lens system pursuant to claim 1, wherein the elastic element is made of either a polymer material or spring steel.

3. The camera housing/lens system pursuant to claim 2, wherein the polymer material is a rubbery elastic material that forms an elastic rubber ring.

4. The camera housing/lens system pursuant to claim 2, wherein the elastic element is a metal shaft ring.

5. The camera housing/lens system pursuant to claim 1, wherein an undeformed cross-sectional area of the elastic element is elliptical, oval, or circular in shape.

6. The camera housing/lens system pursuant to claim 1, wherein an outer diameter of the elastic element is less than or equal to an outer diameter of the stop member.

7. The camera housing/lens system pursuant to claim 1, wherein an outer diameter of the elastic element has a cross-sectional geometry and an inner diameter such that the inner diameter of the compressed elastic element is less than an outer diameter of the lens thread and/or the connecting thread.

8. The camera housing/lens system pursuant to claim 1, wherein the stop member and the lens mount or the stop member and the lens each include a stop surface, wherein the stop surfaces are substantially perpendicular to the longitudinal lens axis, wherein the elastic element is compressed between the stop surfaces to lock the lens in position.

9. The camera housing/lens system pursuant to claim 1, wherein the connecting thread is an internal thread provided on an inner surface of the lens mount, and the lens thread is an external thread provided on an outer surface of the lens.

10. The camera housing/lens system pursuant to claim 1, wherein the connecting thread is an external thread provided on an outer surface of the lens mount, and the lens thread is an internal thread provided on an inner surface of the lens.

11. The camera housing/lens system pursuant to claim 1, wherein the stop member is a counter nut having a counter-member thread as its internal thread, wherein the stop member is screwed onto the lens thread or onto the connecting thread.

12. The camera housing/lens system pursuant to claim 1, wherein the lens mount is integral with the camera housing.

13. The camera housing/lens system pursuant to claim 1, wherein no fixed lens stop for presetting the position of the lens is provided between the lens and the lens mount.

14. The camera housing/lens system pursuant to claim 1, wherein the lens is in contact with the elastic element and the stop member is formed by a counter member with a counter-member thread which engages the lens thread, wherein the lens is turned relative to the lens mount, and further comprises:
    a first static friction force ($F_{R1}$) acting between the counter member and the elastic element about the longitudinal lens axis is greater than a static friction or sliding friction force which is generated between the lens thread and the counter-member thread by turning the lens relative to the lens mount, plus any friction force generated between the lens thread and the elastic element due to radial expansion of the elastic element; and
    a second static friction force ($F_{R2}$) acting between the elastic element and the lens mount about the longitudinal lens axis is greater than the static friction or sliding friction force which is generated between the lens thread and the counter-member thread by turning the lens relative to the lens mount, plus any friction force generated between the lens thread and the elastic element due to radial expansion of the elastic element.

15. A camera comprising a camera housing/lens system purusant to claim 1, wherein the camera is an industrial camera.

16. A method for setting and locking the position of a lens in a camera housing/lens system comprising a camera housing for a camera and the lens having a longitudinal lens axis, wherein the camera housing is provided with a lens mount for attaching the lens, the lens mount including a connecting thread and the lens including a lens thread, wherein said connecting thread and said lens thread engage when the lens is attached, whereby a position of the lens along the longitudinal lens axis in relation to the lens mount can be set by turning the lens relative to the lens mount, the method comprising the steps of:
    providing a lock for locking the lens in position, wherein the lock includes a stop member formed on the lens mount or a counter member having a counter-member thread that engages in the lens thread or in the connecting thread, wherein the stop member is formed by a counter member having a counter-member thread that engages the lens thread or the connecting thread;
    providing an elastic element arranged between the counter member and the lens mount or between the stop member or counter member and the lens;
    turning the lens relative to the stop or counter member to compress the elastic element between the stop or counter member and the lens mount or between the stop or counter member and the lens in order to lock the lens in position, wherein a gap remains between the stop or counter member and the lens or between the stop or counter member and the lens; and
    turning the lens relative to the lens mount, with the elastic under tension, in order to finely adjust the position of the lens in relation to the lens mount.

17. The method according to claim 16, wherein the friction forces between the elastic element, the counter member, the lens thread and the counter-member thread are such, when the lens is locked into position, that upon turning the lens relative to the lens mount, the lens thread turns relative to the connecting thread and to the counter-member thread.

* * * * *

UNITED STATES PATENT AND TRADEMARK OFFICE
CERTIFICATE OF CORRECTION

PATENT NO. : 10,437,134 B2
APPLICATION NO. : 15/753985
DATED : October 8, 2019
INVENTOR(S) : Kholopov et al.

Page 1 of 1

It is certified that error appears in the above-identified patent and that said Letters Patent is hereby corrected as shown below:

In the Claims

Column 14, Claim 16, Line 35, after "elastic" insert --element--.

Signed and Sealed this
Fourth Day of February, 2020

Andrei Iancu
*Director of the United States Patent and Trademark Office*